United States Patent
Tuerk et al.

(10) Patent No.: US 7,229,120 B2
(45) Date of Patent: Jun. 12, 2007

(54) TARPING SYSTEM TRANSPORT METHOD

(75) Inventors: James Tuerk, Indianapolis, IN (US); Jerry Ace, Indianapolis, IN (US); Marvin Hunt, Indianapolis, IN (US); Joseph Cooper, Monrovia, IN (US)

(73) Assignee: Aero Industries, Inc., Indianapolis, IN (US)

( * ) Notice: Subject to any disclaimer, the term of this patent is extended or adjusted under 35 U.S.C. 154(b) by 186 days.

(21) Appl. No.: 11/145,761

(22) Filed: Jun. 6, 2005

(65) Prior Publication Data
US 2006/0273614 A1 Dec. 7, 2006

(51) Int. Cl.
*B60P 7/02* (2006.01)
(52) U.S. Cl. .............................. 296/100.12; 296/100.11
(58) Field of Classification Search ........... 296/100.12, 296/100.11, 100.13, 100.14
See application file for complete search history.

(56) References Cited

U.S. PATENT DOCUMENTS

| | | | |
|---|---|---|---|
| 905,571 A | 12/1908 | Pangborn | |
| 1,263,759 A | 4/1918 | Hanaway | |
| 3,326,598 A | 6/1967 | Kunsch | |
| 4,711,484 A | 12/1987 | Tuerk | |
| 4,902,064 A | 2/1990 | Tuerk et al. | |
| 5,538,313 A * | 7/1996 | Henning | ................ 296/100.12 |
| 6,634,697 B1 * | 10/2003 | Petelka | ................ 296/100.12 |

* cited by examiner

*Primary Examiner*—Joseph D. Pape
(74) *Attorney, Agent, or Firm*—Maginot, Moore & Beck

(57) ABSTRACT

A method for shipping a retractable cover system include pre-assembling the cover system to include the flexible cover and enough components to support the cover on guide rails mounted to a trailer or other transport vehicle. At least two pre-assembled cover systems are compressed along their length and then loaded sequentially onto the guide rails of the same trailer. In certain embodiments, four compressed partially pre-assembled cover systems are loaded onto a single trailer. The trailer is then transported to one or more customer sites where one or more of the compressed cover systems are unloaded. The cover systems may be only partially pre-assembled, with the remaining components placed on the trailer within the compressed cover system when it is loaded on the trailer. The cover systems may be maintained in their compressed state by a tension element or tensioned apron wrapped around the compressed cover system.

14 Claims, 3 Drawing Sheets

TARPING SYSTEM TRANSPORT METHOD

BACKGROUND OF THE INVENTION

The present invention relates to cover systems for hauling vehicles, and particularly to extendible/retractable tarping systems for flatbed vehicles.

Retractable covers for load-carrying vehicles have been known for nearly a century. A folding wagon top was disclosed in U.S. Pat. No. 905,571 in which a flexible cover was folded forward across the load bed to provide easy access for loading and unloading goods from the bed. In U.S. Pat. No. 1,263,759, a retractable vehicle cover was disclosed in which the cover was supported on U-shaped bows that were slidably mounted on bars along opposite sides of the vehicle body. These concepts were adapted to a retractable cover for use on a flatbed tractor-trailer system in U.S. Pat. No. 3,326,598.

In spite of this long history, the extendable-retractable cover system did not achieve commercial viability and success until the CONESTOGA® tarping system was introduced by Aero Industries, Inc. in the late 1980's. Details of this tarping system are disclosed in U.S. Pat. Nos. 4,711,484, 4,902,064 and 5,538,313, each disclosure of which is incorporated herein by reference. In general terms, the CONESTOGA® tarping system 10 is configured to be mounted onto the flatbed 12 of a hauling vehicle T, as shown in FIGS. 2-3. The tarping system 10 includes a flexible cover or tarpaulin 14 with a top panel 15 and opposite side panels 16 configured to cover the flatbed 12. A series of bows 18 support the top panel 15 of the tarp and provide means for integrating the tarping system with the vehicle flatbed. A front bulkhead 20 closes the front end of the trailer, while a retractable flap 21 may be provided to close the back end of the load bed.

The tarping system 10 is configured to be retracted or compressed into a short space, such as the tarping system 10' depicted in FIG. 2. The tarping system includes a front bow arrangement 22' and a rear bow arrangement 24' that sandwich the tarp 14' therebetween, folded like an accordion. The tarping system may be extended so that the tarp 14" spans the entire flatbed 12. In this extended position, the front bow arrangement 22' is connected to the front bulkhead 20, while the rear bow arrangement 24" is locked to the rear of the flatbed.

One configuration of the tarp support structure is shown in FIG. 3. The structure includes a series of bows 18 that support the tarp 14 between the front and rear bow arrangements 22, 24, respectively. The bows are connected to a carriage assembly 32 that is configured to ride within guide rails 30 attached to the opposite sides of the flatbed 12. With this arrangement, the load surface 13 of the flatbed 12 is not interrupted by the tarping system itself, thereby maximizing the load space on the flatbed.

The tarp support structure may also include uplift bow assemblies 19 that are situated between successive U-shaped bows 18. These uplift bow assemblies help maintain the tarp in tension when the cover system 10 is in its extended load-covering position shown in FIG. 1. The tarp support structure is configured so that the bows 18 and 19 can collapse onto each other when the cover system is retracted to the configuration 10' shown in FIG. 2. The front bow arrangement 22 is connected or locked to the bulkhead 20 by a front locking mechanism 26. The front locking mechanism allows the front end of the cover system to be disengaged and the tarp 14 retracted toward the rear of the trailer, rather than to the front of the trailer as depicted in FIG. 2. The rear bow arrangement 24 includes a rear tensioning and locking mechanism 28 that pulls the tarp 14 into tension when the system is extended and locks the rear bow arrangement to the rear of the trailer 12. Details of the tarp support structure, the locking and tensioning mechanisms, and other components of the tarping system 10 may be obtained from the '484, '064 and '313 identified above and incorporated herein by reference.

The retractable tarping system 10 is adapted to be mounted on an existing trailer, such as trailer 12, without substantial modification to the trailer. In order to support the tarp supporting bows, guide rails 30 are mounted to the sides of the flatbed. While that part of the installation is relatively easy, the construction of the remainder of the cover system 10 is often very involved. The construction and installation of the cover system 10 is not conducive to being performed by the ultimate customer. Typically, installation of a retractable tarping system on a customer's flatbed occurs at pre-determined installation sites. Accuracy of the installation is important to the proper functioning of the tarping system, so complete system installation is usually reserved to trained technicians.

However, in many instances, the customer is not able to part with a trailer for an extended period of time for the installation of a cover system. Moreover, approved installation sites are frequently swamped by demand, where several tarping systems are to be installed, such as when a customer is converting a fleet of trailers to a retractable tarping system. In this instance, the often lengthy installation time for a single cover system 10 can frustrate the desire for rapid turnaround so the flatbed fleet can return to work.

Consequently, there is a need for a shipping method that allows for pre-assembly of at least a significant portion of a retractable cover system. With this novel method, the bulk of the complicated installation and assembly can occur where the system components are manufactured. Moreover, this method eliminates, or at least significantly reduces, the number of trained installation technicians that must be available off-site from the manufacturing facility.

SUMMARY OF THE INVENTION

In view of these needs, the present invention contemplates a method for transporting a retractable tarping system in a pre-assembled condition. The method contemplate shipping at least two retractable tarping systems, each system including a flexible cover and a retractable cover support mechanism, with the support mechanism including a plurality of carriages configured for sliding engagement to guide rails attached to a trailer or transport vehicle. The steps of the method comprise providing a transport vehicle having guide rails mounted to opposite sides thereof, compressing each of the tarping systems along their respective lengths, sequentially loading each of the tarping systems on the guide rails mounted to the vehicle, delivering the vehicle to at least one separate location, and then sequentially unloading a tarping system from the transport vehicle at each location.

In the preferred embodiment, the step of compressing each of the tarping systems may include wrapping an element around each compressed tarping system. The element may help hold the system in its compressed state; however, a perhaps more important function of the element is to keep the tarp of the compressed system from flapping. When the tarping system is compressed or retracted, the tarp itself forms pleats between the tarping system bows. Left unconstrained these pleats will flap under wind pressure as the system is transported along the highway. It is therefore important that the tarp pleats be restrained.

In a preferred embodiment, the element may comprise an apron that is configured to wrap partially around the compressed tarping system. The free ends of the apron are connected by a plurality of tension elements, which are preferably in the form of bungee cords or tensioning straps.

The apron is sized to wrap around the outer face of the compressed tarping system, while the free ends and tension elements are housed within the interior of the compressed tarping system. Most preferably, the apron is a mesh that allows some air to flow through the apron. The pressure of the air flowing through the apron, together with the tension in the apron, adequately restrains the tarp pleats from flapping, even at highway speeds.

In accordance with the preferred embodiment, the tarping systems are only partially assembled. In this instance, the step of loading includes storing additional components of each partially assembled tarping system within the compressed tarping system when it is loaded onto the flatbed. For instance, the additional components may include a front bulkhead for each tarping system. For the shipment of the plurality of compressed tarping systems, a separate bulkhead is mounted to the front of the trailer, in which the bulkhead is preferably larger than the tarping system front bulkhead.

In certain embodiments, the method includes an initial step of partially assembling each tarping system to include the tarp, the carriages and enough components of the cover support mechanism to support the tarp on the guide rails when the tarping system is in its compressed state. In these embodiments, the pre-assembled cover system is assembled on a staging rack and is trued or squared on the rack so that the final cover system will be true and square when it is mounted on the customer's flatbed. The step of partially assembling is preferably followed by the step of pre-stretching the tarp, again to ensure that the tarping system will fit and operate properly when it is installed in its final form on the customer's flatbed. Once the tarp has been pre-stretched, the cover system is then compressed and preferably the apron and tension elements wrapped around the compressed cover system, all while the cover system is mounted on the staging rack.

In accordance with the invention, the partially assembled tarping system is pre-assembled on the staging rack, removed in its compressed state and loaded directly onto the shipping flatbed, all while in its compressed state. Additional compressed tarping systems are pre-assembled, compressed and mounted on the same flatbed in preparation for shipment to a distributor or end customer. Once the shipment arrives at its destination, the tarping systems may be removed from the shipment flatbed in their compressed states and preferably loaded directly onto a customer's flatbed. If the cover system was shipped only partially assembled, the remaining components are removed from the shipment flatbed and used to complete the, final assembly of the cover system on the customer's flatbed.

One benefit of the present invention is that is eliminates a substantial amount of time and effort in the installation of a retractable cover system on a customer's flatbed. Another benefit is that the inventive method significantly streamlines the shipment of cover systems to multiple separate locations. Other benefits of the invention will become apparent upon consideration of the following written description and accompanying figures.

DESCRIPTION OF THE PREFERRED EMBODIMENT

Figure 1:
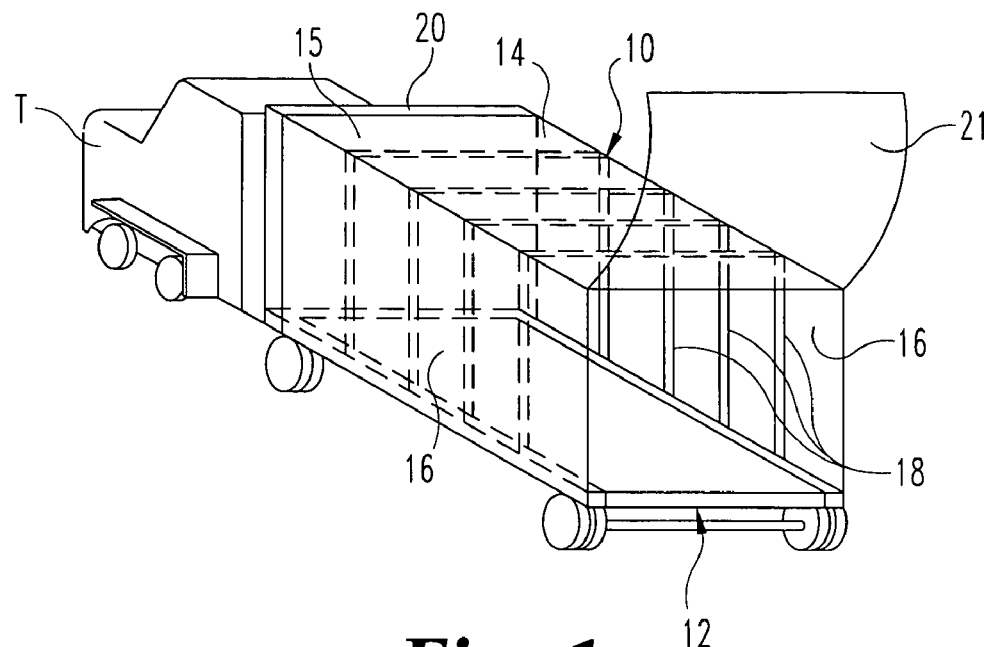
FIG. 1 is a rear perspective view of a retractable cover system mounted on a trailer.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
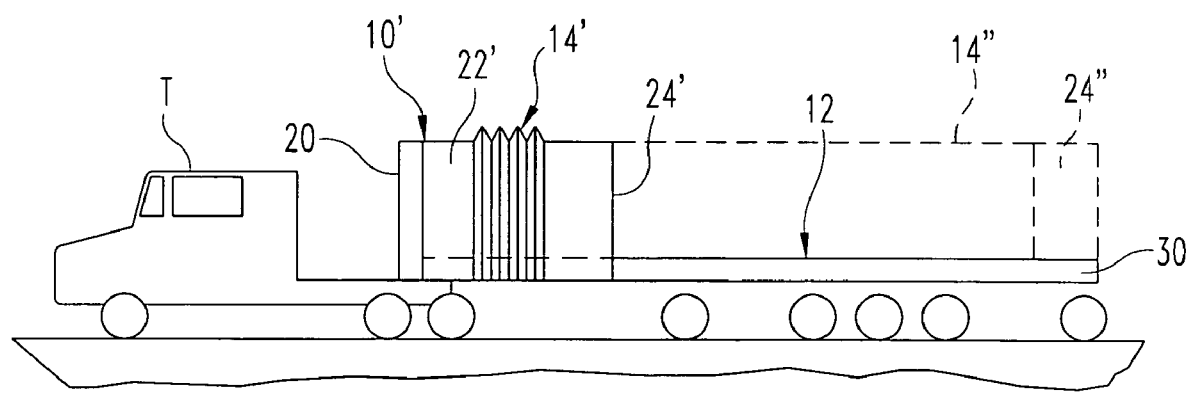
FIG. 2 is a side view of the installation shown in FIG. 1, with the cover system shown in its retracted configuration and shown in phantom lines in its extended configuration.
Figure 3:
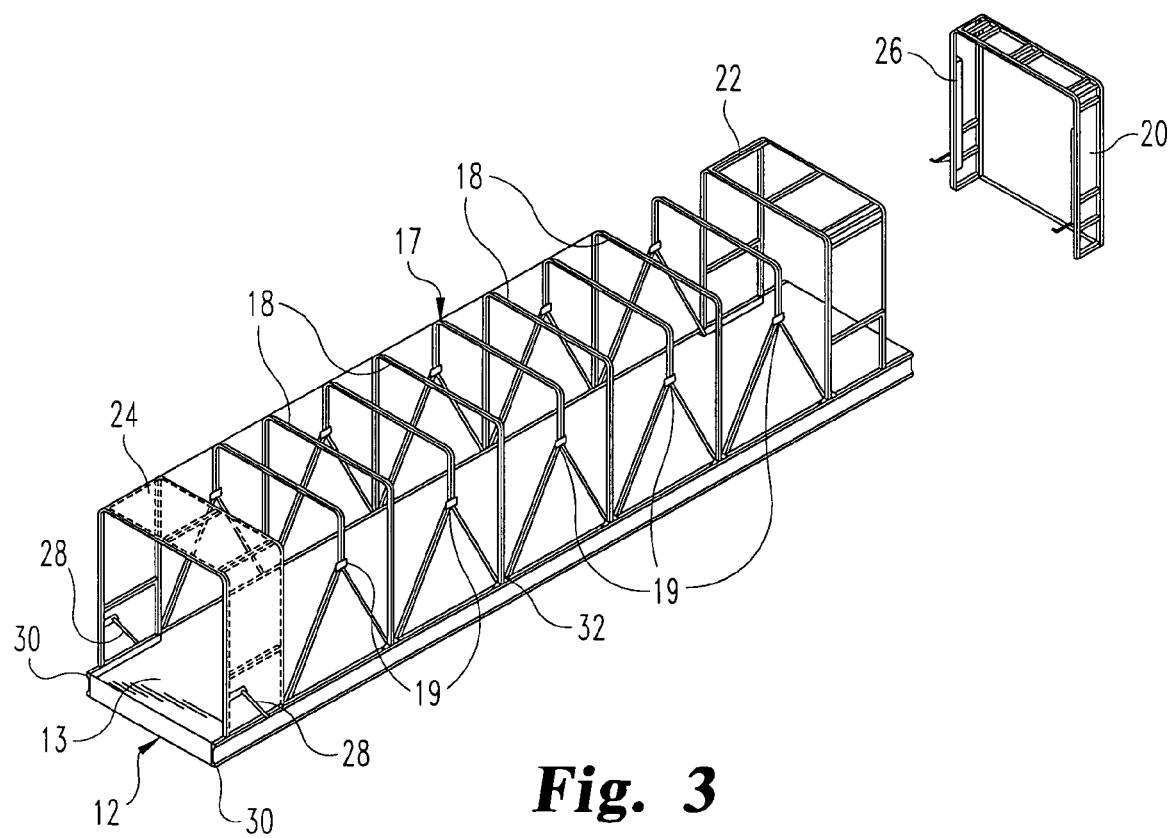
FIG. 3 is a top perspective view of the tarp support structure for the cover system shown in FIGS. 1–2.

The present invention provides a method for transporting retractable-extendable tarping systems, such as the tarping system 10 depicted in FIGS. 1–3, that are intended to be mounted on a trailer, flat bed or other transport vehicle. Although the tarping system 10 is intended only to provide an example of a retractable tarping system, it is contemplated that such a system is adapted to be slidably supported on guide rails that are mounted to the flatbed, trailer, low-sided dump trailer, rail car, or other transport vehicle. For the purposes of the present disclosure, guide rails, like the guide rails 30 described above, are shown mounted to the side of a flatbed; however, other transport vehicles and other guide rail mounting arrangements are contemplated, along with the associated modifications to the retractable cover system itself to accommodate the new mounting arrangement.

In accordance with the preferred embodiment of the invention, a method for transporting multiple tarping systems contemplates at least partially assembling the cover system at an OEM location. Thus, the cover system may be manufactured and assembled at one central location for shipment to customers or distributors across the country and throughout the world. The cover system includes, at least, the tarp 14, the front and rear bow arrangements 22, 24, and at least some components of the tarp support mechanism 17, including the intermediate bows 18 and the carriages 32 that are adapted to engage the guide rails 30. In other words, the cover system includes enough components to be slidably mounted on guide rails and enough components so that the transported tarping system can be compressed to its smallest overall length.

Figure 4:
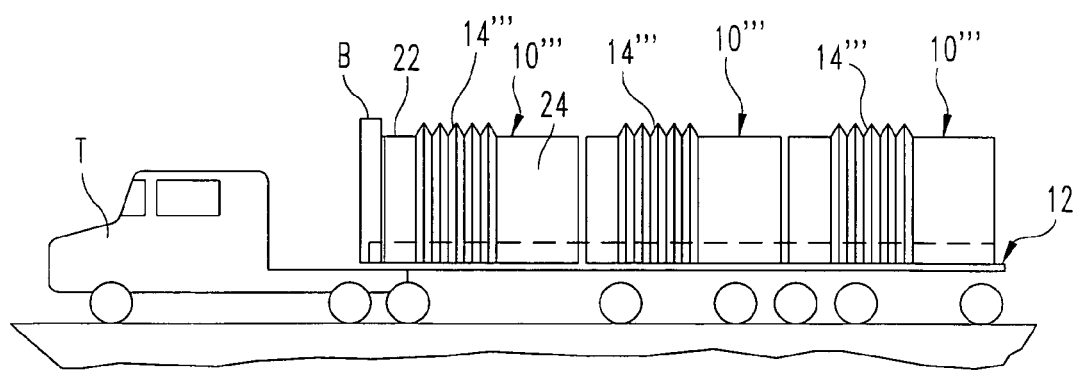
FIG. 4 is a side view of a trailer with several compressed cover systems supported thereon, in accordance with one aspect of the present invention.

As shown in FIG. 4, the cover systems 10''' include the front and rear bow arrangements 22, 24, the tarp in a compressed state 14''' and tarp supporting mechanism 17 (not shown) in its retracted state. The cover systems 10''' are sufficiently compressed so that at least three such systems may be mounted on a single flatbed 12 outfitted with the guide rails 30 (not shown). In the shipping arrangement shown in FIG. 4, a bulkhead B is preferably provided that is larger than the cover systems 10''' to serve as a wind break for the systems. The bulkhead B may be mounted to the front of the flatbed in a conventional manner. The bulkhead may be a DURALITE® wrap-around bulkhead, manufactured by Aero Industries, Inc., that is sized to the width of the particular trailer 12.

The cover system 10''' is preferably at least partially pre-assembled at a central location, most preferably at the OEM location. The components of the cover system are then readily available and an organized assembly process may be implemented from component manufacture, to sub-assembly production, to final assembly of the cover system 10''' to be loaded on a flatbed for shipment. The partially assembled cover system 10''' incorporates the components identified above, which are not only sufficient for transport but also for performing certain steps that are necessary in the preparation of a retractable tarping system. For instance, it is essential that the tarp support and carriage system be accurately connected and squared so that the tarping system will slide smoothly along the guide rails and so that the front bow arrangement 22 will form a weather-tight seal with the front bulkhead (such as bulkhead 20 in FIGS. 1–2). If the cover system 10''' is not square, the front bow arrangement may not glide into position to be locked to the front bulkhead or may not adequately seal at that location.

Thus, in the pre-assembly phase, the tarping system 10''' is partially assembled on a staging rack that is part of the central or OEM facility. The pre-assembled system may then be extended on the staging rack to pre-stretch the tarp if desired. With this step, the finally assembled tarping system 10 will be ready for immediate use once it is installed on the customer's flatbed. In the past, when the cover system was assembled directly on the customer's flatbed, the tarp required pre-stretching before it could be used, which adds an additional delay to the ability of the customer to return the flatbed to use.

Figure 5:
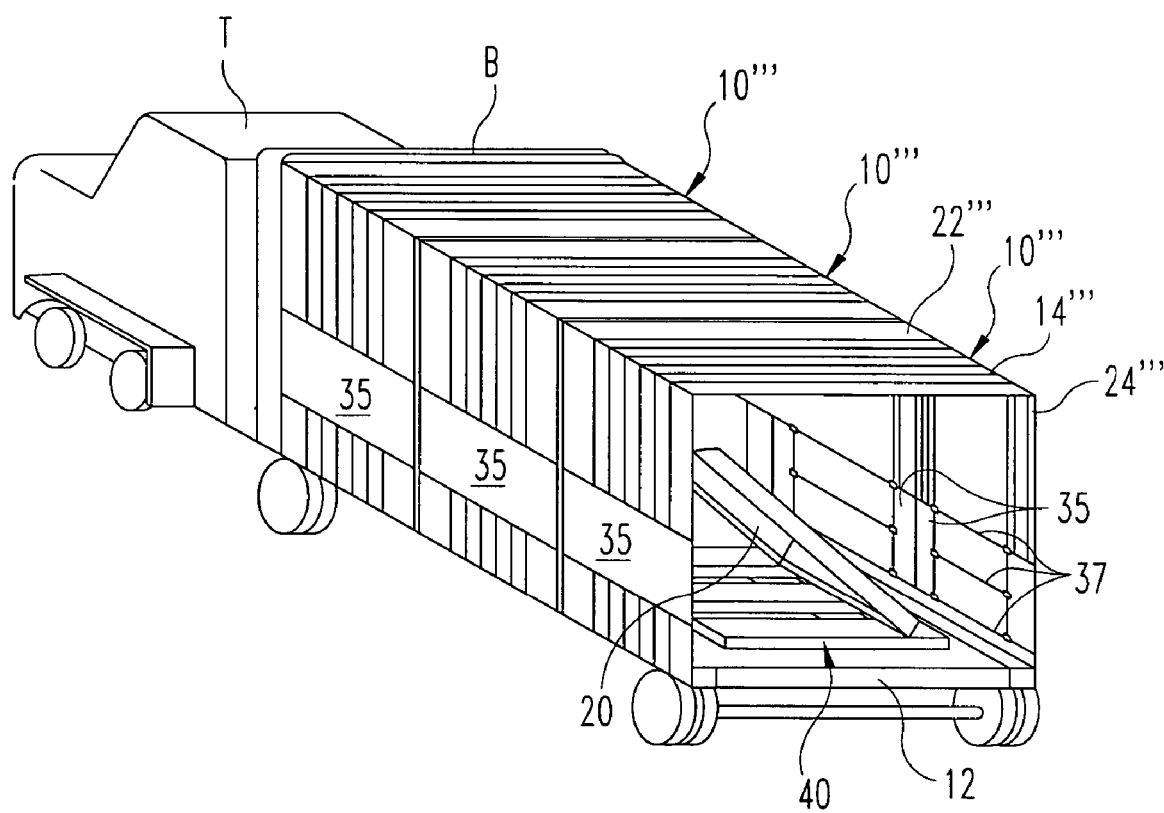
FIG. 5 is a rear perspective view of the arrangement shown in FIG. 4.

As shown in FIG. 5, the multiple cover systems 10''' mounted on the flatbed 12 forms a cargo enclosure, just like the enclosure formed by a complete cover system (FIG. 1), albeit smaller than a fully extended tarping system. In accordance with a further aspect of the preferred method, a pallet 40 may be housed within each compressed tarping system 10'''. The pallet 40 can carry components of the tarping system that are not pre-assembled. For instance, a front bulkhead 20 can fit on the pallet at an angle within the enclosure of the compressed cover system 10'''. Other components of the complete system may also be carried on the pallet 40, such as the locking mechanism 26, the rear tensioning mechanism 28 and the uplift bow assemblies 19. Preferably, the non-assembled components that are carried within the enclosure are limited to components that are relatively quick and easy to install and that do not impact the squareness of the tarping system when it is finally installed on the customer's flatbed.

It can be appreciated that the degree of assembly of each tarping system 10''' loaded for shipment may vary depending upon the particular customer order. For instance, in some cases, a nearly completely assembled cover system is warranted, so that only the front bulkhead 20 will be loaded onto a pallet. In other cases, the customer already has a front bulkhead on an existing trailer, so the additional components loaded on the pallet may be minimal, if any.

In a further feature of the preferred embodiment, the compressed tarp systems 10''' are bound by a restraint element 35 that encircles each side of the system, as shown in FIG. 5. The restraint element is preferably held in tension to restrain the tarp and cover system in the compressed state. Thus, in one embodiment, tension straps 37, such as bungee cords or ratcheted canvas straps may be provided to engage the opposite ends of the element 35 on the inside of the tarping system 10''' to maintain the element tightly bound around the cover system. Optionally, the element itself may be formed of an elastic material with its ends interconnected or fastened to a fixed element of the tarping system.

In the most preferred embodiment, the restraint element 35 is fabricated to be weather-proof and to be re-used. Thus, once the tarping system has been unloaded, the element 35, tension straps 37 and pallet 40 can be returned to the OEM.

In a further feature, the restraint element 35 is an apron made of a canvas or mesh material. Most preferably, the apron is a nylon mesh that permits air flow through the apron. One important function of the apron is to restrain the tarp itself from flapping while the cover system is being transported. When the cover system is compressed or retracted, the tarp forms folds or pleats between the cover system bows. Unless restrained these pleats will flap under wind pressure, which not only creates significant noise but also risks tearing of the tarp material in transit. A restraint element in the form of a cord wrapped around the cover helps hold the pleats but does not significantly prevent tarp flapping. An apron formed of a tighter weave, such as a canvas material, helps restrain the tarp pleats better than the cord, but still not enough to substantially eliminate tarp flapping. It has been found that an apron of a mesh material that allows some air flow through the apron optimally restrains the tarp and prevents the pleats from flapping, even at highway speeds. It is believed that the air flowing through the mesh exerts an air pressure force against the entrapped tarp pleats that helps hold the pleats down. In addition, the air flow through the mesh reduces or eliminates the pressure differential at the edges of the apron that has a tendency to pull the tarp material.

It should also be appreciated that by shipping pre-assembled cover systems 10''', loading and un-loading of the systems is simplified, especially with an apron 35 holding each cover system in its compressed state. When the cover system is pre-assembled on the staging rack, the apron may be added to bind the compressed tarping system. A fork lift or overhead lift may then be used, as is known in the art, to slide the newly assembled cover system from the staging rack and slide the system onto an awaiting flatbed. The flatbed may be situated at the OEM facility near the staging area, so that it is readily available as a new tarping system is completed. Depending upon the type and dimensions of the tarping system, up to four compressed systems 10''' may be loaded onto a 48 foot trailer. Of course, fewer systems may be loaded on a particular trailer depending upon the customer needs at the eventual shipping destination. It is contemplated that several trailers may be situated near several staging racks, with distribution control procedures in place to determine onto which flatbed a newly assembled tarping system is loaded.

Once a flatbed has been fully loaded it is transported by truck to a distributor or customer. At that location, the requisite number of cover systems is unloaded from the flatbed. The cover system(s) may be unloaded using a forklift or overhead lift and transferred directly to a waiting flatbed of the customer's fleet or to a storage area. Again, with the apron 35 in place binding the compressed tarping system 10''' the transfer of the system from one flatbed to another is greatly facilitated. Once the requisite number of cover systems has been unloaded at one location, the trailer can be transported to another location where one or more of the remaining systems 10''' can be unloaded.

It can therefore be appreciated that the present method not only simplifies the shipping of retractable tarping systems, it also streamlines the distribution capabilities. For instance, where four customers within a particular region desire only one tarping system, four tarping systems may be loaded onto one flatbed and then that trailer is transported to each customer where that customer's product is unloaded. Alternatively, where one customer desires to outfit a large fleet with the retractable tarping systems 10, several flatbeds fully loaded with the compressed systems 10′′′ may be transported to the customer. All of the systems may be unloaded and mounted on all of the customer's trailers in one day so that the entire fleet is ready for business as quickly as it takes to complete the assembly of each tarping system on each flatbed.

The method of the present invention contemplates loading multiple compressed tarping systems 10′′′ on a single flatbed 12. In some cases, adjacent tarping systems 10′′′ may be coupled together to minimize vibration and noise. While the forward most one of the tarping systems 10′′′ is restrained by the bulkhead B, the rearmost system may be mechanically constrained relative to the trailer. In one embodiment, the rearmost system 10′′′ may include a rear tensioning mechanism 28, which may then be used to attach the rear bow arrangement 24 to the trailer. Alternatively, a stop element may be fixed within each guide rail 30 to prevent removal of the carriages 32 of the rearmost system.

In a further modification, the bows of each individual tarping system may be linked. In this modification, a bar may span multiple bows with each bow fastened to the bar, or a bar may be fastened between adjacent bows. Preferably, the bows are fastened to the bar(s) in a way that can be quickly disconnected. Thus, the connection may be made using a pin passing through bores in the bar and a corresponding bracket attached to each bow, with a cotter pin to hold the pin in place. The bar is preferably connected to an existing bracket or attachment point on the bow or bow carriage.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, as explained above, while the cover systems have been disclosed mounted to a flat bed trailer, other transport vehicles, other retractable cover systems and other mounting arrangements are contemplated. For instance, the compressed cover systems may be transported on an appropriately configured rail car or low-sided dump trailer. In addition, while the guide rails in the illustrated embodiments are mounted to the sides of the trailer, the rails or a similar guide track may be mounted to the upper surface of a trailer or dump body. Furthermore, while the cover system depicted in the figures is based on the CONESTOGA® Tarping System, the shipping and transport method of the present invention can work equally well with other commercially available retractable tarping or cover systems.

What is claimed is:

1. A method for shipping at least two retractable tarping systems, each system including a flexible cover and a retractable cover support mechanism, the support mechanism including a plurality of carriages configured for sliding engagement to guide rails attached to a transport vehicle, the method comprising:
   providing a transport vehicle having guide rails mounted to opposite sides thereof;
   compressing each of the tarping systems along their respective lengths;
   loading each of the tarping systems on the guide rails mounted to the transport vehicle;
   delivering the transport vehicle to at least one location; and
   then unloading a tarping system from the transport vehicle at the location.

2. The method for shipping of claim 1, wherein the step of compressing each of the tarping systems includes wrapping an element around each compressed tarping system to restrain the flexible cover.

3. The method for shipping of claim 2, wherein the step of wrapping an element includes wrapping an element around each side wall of the tarping system.

4. The method for shipping of claim 2, wherein the step of wrapping an element around each compressed tarping system includes:
   wrapping an apron partially around the compressed tarping system; and
   attaching at least one tension element between the free edges of the partially wrapped apron to place the apron in tension.

5. The method for shipping of claim 2, wherein the element is an apron formed of a mesh material that permits air flow through the mesh.

6. The method for shipping of claim 1, wherein the tarping systems are only partially assembled, and the step of loading includes storing additional components of each partially assembled tarping system within the compressed tarping system when it is loaded onto the transport vehicle.

7. The method for shipping of claim 6, wherein the additional components include a front bulkhead for each tarping system.

8. The method for shipping of claim 1, comprising an initial step of partially assembling each tarping system to include the tarp, the carriages and enough components of the cover support mechanism to support the tarp on the guide rails when the tarping system is in its compressed state.

9. The method for shipping of claim 8, wherein the step of partially assembling is followed by the step of pre-stretching the tarp of the partially assembled cover system.

10. The method of shipping of claim 8, wherein:
    the step of partially assembling occurs on a staging rack; and
    the step of compressing occurs with the partially assembled cover system on the staging rack.

11. The method for shipping of claim 1, wherein the step of compressing each of the tarping systems includes wrapping an element around each compressed tarping system to restrain the flexible cover.

12. The method for shipping of claim 11, wherein the step of wrapping an element around each compressed tarping system includes:
    wrapping an apron partially around the compressed tarping system; and
    attaching at least one tension element between the free edges of the partially wrapped apron to place the apron in tension.

13. The method for shipping of claim 1, wherein the step of unloading occurs with each tarping system in its compressed state.

14. The method for shipping of claim 13, further comprising the step of mounting the unloaded tarping system in its compressed state onto the guide rails of another transport vehicle.

* * * * *